(12) United States Patent
Yoo

(10) Patent No.: US 6,421,146 B1
(45) Date of Patent: Jul. 16, 2002

(54) APPARATUS AND METHOD FOR SHADING CORRECTION IN IMAGE SCANNING SYSTEM

(75) Inventor: Young-Jun Yoo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/320,021

(22) Filed: May 26, 1999

(30) Foreign Application Priority Data

May 26, 1998 (KR) ............................................. 98-19031

(51) Int. Cl.[7] ................................................. H04N 1/40
(52) U.S. Cl. ...................................................... 358/461
(58) Field of Search ................................ 358/461, 406, 358/504; 382/274; 399/207

(56) References Cited

U.S. PATENT DOCUMENTS

| | | | | |
|---|---|---|---|---|
| 4,760,464 A | * | 7/1988 | Sakano ........................ 358/461 |
| 4,916,549 A | * | 4/1990 | Sekizawa ..................... 358/461 |
| 5,644,409 A | * | 7/1997 | Irie et al. ..................... 358/461 |
| 5,802,217 A | * | 9/1998 | Suzuki et al. ................ 382/274 |
| 5,864,408 A | * | 1/1999 | Kumashiro ................... 358/461 |
| 6,295,140 B1 | * | 9/2001 | Kameyama ................... 358/461 |
| 6,295,383 B1 | * | 9/2001 | Smitt et al. .................. 382/274 |

* cited by examiner

*Primary Examiner*—Cheukfan Lee
(74) *Attorney, Agent, or Firm*—Robert E. Bushnell, Esq.

(57) ABSTRACT

A a shading correction apparatus and method for an image scanning system are provided. The shading correction apparatus of an image scanning system includes: an analog/digital converter for converting the analog image signals into digital image data having a preset number of bits; a shading memory for storing a shading factor matrix prepared from a first shading reference pattern at the preset storage time; a time determination corrector for periodically generating correction determination data as shading data achieved from a second shading reference pattern to determine the correction time for optical parts, and informing whether deviation data between correction data at the present time and preset standard data is above a certain allowed value; and a shading corrector to perform shading correction on receipt of the output from the analog/digital converter using the shading factor matrix when the operation of the image scanning system is in a real scan mode.

40 Claims, 4 Drawing Sheets

APPARATUS AND METHOD FOR SHADING CORRECTION IN IMAGE SCANNING SYSTEM

CLAIM OF PRIORITY

This application makes reference to, incorporates the same herein, and claims all benefits accruing under 35 U.S.C. §119 from an application for APPARATUS FOR SHADING CORRECTION IN IMAGE SCANNING SYSTEM AND METHOD THEREFOR earlier filed in the Korean Industrial Property Office on the 26th of May 1998 and there duly assigned Ser. No. 19031/1998.

BACKGROUND OF THE INVENTION

1. Field of the Invention

The present invention relates to an apparatus and a method for shading correction in an image scanning system. More particularly, the present invention relates to an apparatus and a method for shading correction in an image scanning system for informing a user of any presence of errors of shading correction above predesignated allowable values by performing shading correction using correction shading data stored in a non-volatile memory, for adjusting the image quality, and preparing periodically determination shading data to determine the maintenance time for cleaning and fixing in the image scanning system.

2. Description of the Related Art

An image scanning apparatus such as a scanner is a widely-used means for scanning printed materials, photographs, letters or drawings made by hand, etc. into color or black-and-white images, and is one of the main components of a multi-function peripheral (MFP), a translator for documents, a computer for computer aided design (CAD), facsimile, a character recognizer, a digital copier, etc.

The demand for office equipment such as a digital copier, a printer, a scanner, and a fax machine, etc. becomes greatly increased owing to the development of office automation, and also, the technology for each office equipment is highly-improved in order to maximize its function for office automation.

Of the equipment, a multi-function peripheral (MFP) recently represents the above-described high-development of office automation, and the MFP is a system made by integrating multiple pieces of the above equipment, which were used respectively with their own function thereby reducing the financial cost, and saving space for installation. Also, the MFP has a function of outputting documents. In addition, the MFP is one of the representative systems to employ an image scanning system such as a scanner.

In other words, the MFP is a system capable of outputting documents in multiple ways, i.e. it can print the data transmitted from a host computer, read a document as an image as a scanner, print and copy the scanned image document, transmits the image document to far-away distant places through a communication path as a facsimile, etc. That is, it is a multi-functional terminal system to integrate a facsimile, a scanner, a printer, a copy machine, etc. which were single equipment, respectively. Also, it has a host computer-interface function to communicate with a host computer.

As described above, referring to the MFP as an example, there are various types of products being widely-used and commercially-available, and having multi-functions by means of the integration and the linkage connection of related equipment with the scanner as a basic component. The "image scanning system" referred in this application relates to equipment having the image scanning function. In this regard, the present invention is directly related with the technology of performing shading correction in the above described image scanning system.

In a typical image treatment in general, "shading" is a phenomenon present in an image pickage tube such as vedicon, cathode ray tube(CRT), etc., wherein the output from, for example, a CRT is not uniform, and so, the light density produced from the output image is different according to the portions. The shading is attributed to some reasons, such as non-uniformity of a target, or redistribution of secondary electrons on the target.

The distorted image can be adjusted using an adjustable electron lens. Recently, shading is also cited in relation to an image input system, such as the image scanning system, broader from the above display device, and "shading correction" refers to image treatment methods to remove the shading phenomenon and improve the distorted image.

In other words, the shading correction is to adjust the darkness or the uneven distortion of the image on a screen in the peripheral edge portion because of the characteristics of the optical mechanism when producing a digital image for a computer by digitalizing general documents, photographs, etc. The shading correction can be made by adjusting the light density, i.e. divide the screen into a number of small areas, determine a conversion function of density for each divided area, and adjust the density such that the image produced on the whole screen has identical light intensity. The shading correction can also be performed by achieving shading data during dummy scanning.

A shading correction apparatus of an image scanning system exemplary of contemporary practice is the art will now be discussed.

First, light emitted from a lamp scans a document. During the scanning step, the light is reflected on the document and is then focused into a optical module. An image sensor which includes image sensors which can sense three primary colors, red(R), blue(B), and green(G), respectively, receives the light irradiated from the optical module by a lamp and changes the light inputted from the optical module into an analog image signal. The image sensor is driven according to a sensor driving clock provided from a scanning controller so as to generate the output of the number of pixels according to the resolution of each image sensor.

The scanning controller controls a lamp driver such that light emitted from the lamp is irradiated on a document and the light reflected from the document is then input into the image sensor via selected paths. Depending on properties of the color image sensors, the input light of the image sensor is converted into an analog image signal which is proportional to light intensity as input, and is output to an analog/digital converter.

Then, the analog/digital converter converts the analog image signal having respective color elements output from the image sensor into a digital image signal having a preset number of bits for each color component.

A shading memory stores shading data corresponding to the digital signal converted from the analog signal of color elements respectively at the corresponding addresses of each color element and each pixel by scanning a shading reference pattern during performing of pseudo scanning and then color-separating. The shading memory also stores a shading factor matrix input from a shading correction controller corresponding with each of the color elements and each of the pixels.

The shading correction controller reads the shading data stored in the shading memory, based on the addresses respectively during the pseudo scanning, achieves a shading factor matrix corresponding to each color element and each pixel by counting the preset maximum light value (M) by the unit of pixels, and supplies the matrix to the shading memory. During performing of the real scanning, the shading correction controller controls the shading memory such that the shading factor matrix stored in the shading memory is output corresponding to each of the color elements and each of the pixels.

A shading corrector corrects the digital image data of each color element output from the analog/digital converter from the shading factor matrix output by the control of the shading correction controller during the real scanning, and then outputs the corrected digital image data, resulting in obtaining digital image data whereby the output deviation among respective color elements is corrected.

Generally, any type of image scanning system might produce great deviation due to various reasons such as the characteristic differences of light reaction, technical differences in the optical mechanism, etc. Preferable ways to solve the problem are to correct the deviation in view of the mechanical system with the assembly completed. However, sometimes, the above access is difficult or impossible technically in many cases. Thus, the shading correction is to solve the above problem by image-treating.

Moreover, the shading factor matrix typically is the most important factor to determine the characteristics of the shading correction, and the shading factor matrix is achieved by pseudo scanning, which refers to scanning a shading reference pattern, such as a white plate and a white paper displaced facing the image sensor, or a white roller.

The shading reference pattern should have the same optical density as that of the white regions of the shading reference pattern. Especially, in a case of using the white roller as a shading reference pattern, there can occur a deviation of an optical amount, which is attributed to the changes of image input distance because a document is supplied between the shading reference pattern and the image sensor. In case of the roller, it should be assembled to be exactly aligned in an image sensing line because it also does document driving and, if the shading reference pattern is contaminated due to the friction with the document, the shading factor matrix should be renewed every time when checking the contamination, which can thereby deteriorate the quality of the image reproduction.

SUMMARY OF THE INVENTION

The present invention is intended to solve the above-described problems and provide a shading correction apparatus of an image scanning system and a method for shading correction in the image scanning system of the present invention.

One object of the present invention is to provide a shading correction apparatus of an image scanning system and a method therefor for the purpose of improving the image quality associated with various types of scanning systems by performing shading correction using correction shading data stored in non-volatile memory, and complying with the maintenance time by properly using periodically-prepared maintenance shading data to determine the maintenance time, and comparing whether there occurs a shading correction deviation above a certain allowed value.

Another object of the present invention is to provide a shading correction apparatus of an image scanning system and a method therefor to thereby provide optimized image quality by removing the image distortion due to the distance between a shading reference pattern and a document and an optical density deviation of the shading reference pattern, to promote reducing expenses due to the improvement of preciseness of the shading reference pattern (i.e. contact, flatness, optical density of white, etc.), and to promote avoiding difficulties of exactly aligning a center line of a white roller to the image sensing line during assembly of components in case of the system using a shading reference pattern of white roller type.

To achieve these and other advantages and in accordance with the purpose and the advantages of the present invention, a method for shading correction of an image scanning system to read image data of a document by photoelectric conversion is provided by the present invention. The method includes preparing the shading factor matrix by scanning a standard shading reference pattern, such as white paper at the time of product production, which is stored in a non-volatile memory without the periodically-carried out pseudo scanning, and using the shading factor matrix, shading correction is performed in a real scanning. Also, a shading correction apparatus of the present invention includes a means for detecting/informing of the contamination/damages of the optical parts of the system so as to automatically detect any negative changes of the characteristics of the optical parts, and the shading factor matrix is renewed in a case of cleaning the fouled optical parts or fixing them with notice of the maintenance time.

It is to be understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
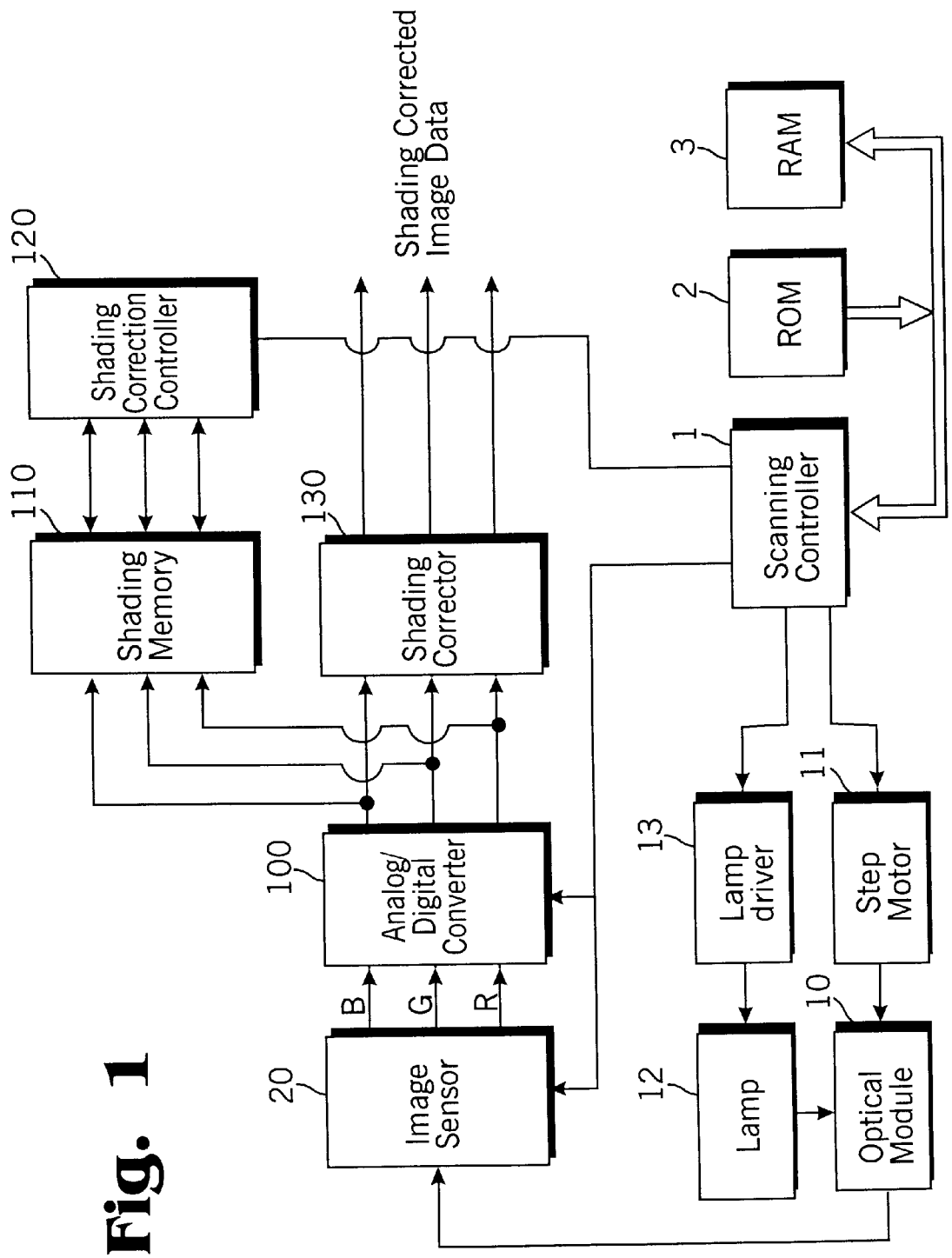
FIG. 1 is a block diagram showing a shading correction apparatus of an image scanning system exemplary of contemporary practice in the art.

Referring to FIG. 1, FIG. 1 is a block diagram showing a embodiment of a shading correction apparatus of an image scanning system exemplary of contemporary practice in the art. First, light emitted from a lamp 12 scans a document. During the scanning step, the light is reflected on the document and is then focused into a optical module 10. An image sensor 20 which includes image sensors which can sense three primary colors, red(R), blue(B), and green(G), respectively, receives the light irradiated from the optical module 10 by lamp 12 and changes the light inputted from the optical module 10 into an analog image signal. The image sensor 20 is driven according to a sensor driving clock provided from a scanning controller 1 so as to generate the output of the number of pixels according to the resolution of each image sensor.

The scanning controller 1 controls a lamp driver 13 such that light emitted from the lamp 12 is irradiated on a document, and the light reflected from the document is then input into the image sensor 20 via selected paths. Depending on properties of the color image sensors, the input light of the image sensor 20 is converted into an analog image signal which is proportional to light intensity as input, and is output to an analog/digital converter 100.

Then, the analog/digital converter 100 converts the analog image signal having respective color elements output from the image sensor 20 into a digital image signal having the preset number of bits for each color component.

A shading memory 110 stores shading data corresponding to the digital signal converted from the analog signal of color elements respectively at the corresponding addresses of each color element and each pixel by scanning a shading reference pattern during performing of pseudo scanning and then color-separating. The shading memory 110 also stores a shading factor matrix input from a shading correction controller 120 corresponding with each of the color elements and each of the pixels.

The shading correction controller 120 reads the shading data stored in the shading memory 110, based on the addresses respectively during the pseudo scanning, achieves a shading factor matrix corresponding to each color element and each pixel by counting the preset maximum light value (M) by the unit of pixels, and supplies the matrix to the shading memory 110. During performing the real scanning, the shading correction controller 120 controls the shading memory 110 such that the shading factor matrix stored in the shading memory 110 is output corresponding to each of the color elements and each of the pixels.

A shading corrector 130 corrects the digital image data of each color element output from the analog/digital converter 100 from the shading factor matrix output by the control of the shading correction controller 120 during the real scanning, and then outputs the corrected digital image data, resulting in obtaining a digital image data for which the output deviation among respective color elements is corrected.

Figure 2:
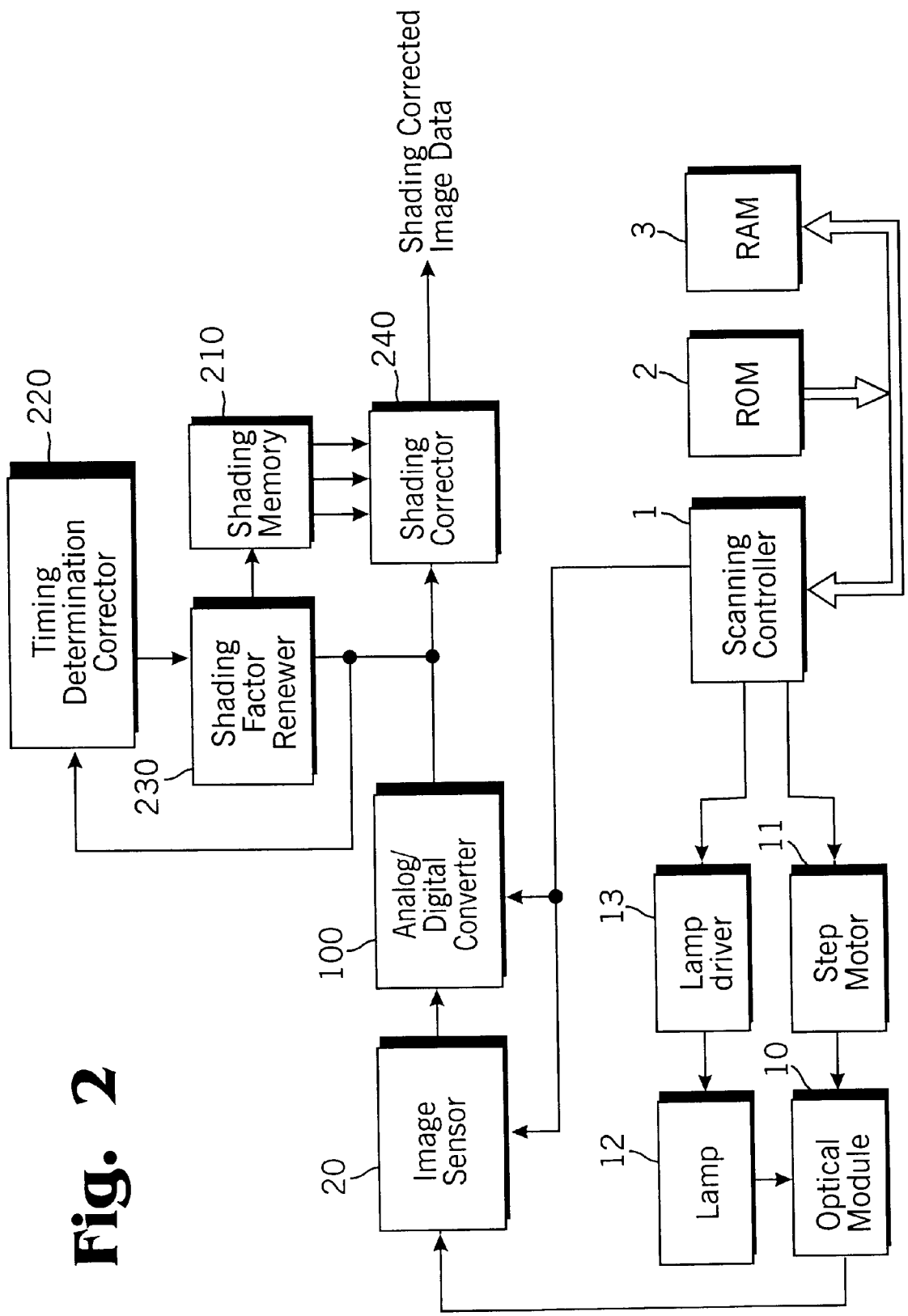
FIG. 2 is a block diagram showing a shading correction apparatus of an image scanning system according to an embodiment of the present invention.

Now, hereinafter, a preferred embodiment of a shading correction apparatus of an image scanning system according to the present invention will be described in detail with reference of FIG. 2 showing a block diagram of the shading correction apparatus.

Referring to FIG. 2, a shading correction apparatus of an image scanning system according to a preferred embodiment reads image data for a document by photoelectric conversion. The image scanning system includes a scanning controller 1 for generating a timing signal for a scanning job, and controlling the operation of the whole image scanning system; a read-only-memory (ROM) 2 for storing reference data and program having an array of specific processing and flow so as to control the scanning system according to the set steps by the scanning controller 1; a random-access-memory (RAM) 3 for storing temporary data generated when the scanning controller 1 controls the image scanning system; a lamp 12 for supplying light to read image information of a document depending on a light amount reflected from the document; a lamp driver 13 for turning on/off the lamp 12 on receipt of a control signal from the scanning controller 1 at the proper time for driving the lamp 12; an optical module 10 for forming a light path along which the light from the lamp 12 is reflected from the document and input to an image sensor 20; a step motor 11 driven on receipt of driving signals from the scanning controller 1 to move the optical module 10 along a sub-scanning direction of a document to a set resolution; an image sensor part 20 to photoelectrically convert the reflected light input via the optical module 10 into electrical analog image signals which are proportional to a light amount; an analog/digital converter 100 for converting the analog image signals into digital image signals of the preset number of bits (m); a shading memory 210 for storing a shading factor matrix which corresponds to each pixel location, the shading factor matrix being achieved from a first shading reference pattern at the preset storage time for direct shading correction; a timing determination corrector 220 for periodically preparing correction determination data from shading data obtained from a second shading reference pattern which determines the correction timing for the optical module 10 including the lamp 12, determining whether the difference data (hereinafter referred to as deviation data) between the correction determination data at a given time, such as the present time, and the preset standard data is within an allowed error range, and informing the determination to a user, when the operation mode of the image scanning system is in a correction determination mode; a shading factor renewer 230 for renewing the shading factor matrix by scanning the first shading reference pattern after fixing the optical system on receipt of the notice that the deviation data from the timing determination corrector 220 is above the preset allowed range; and a shading corrector 240 for performing the shading correction job for the digital image signals output from the analog/digital converter 100 using the shading factor matrix when the operation mode of the image scanning system is the real scanning mode.

Figure 3:
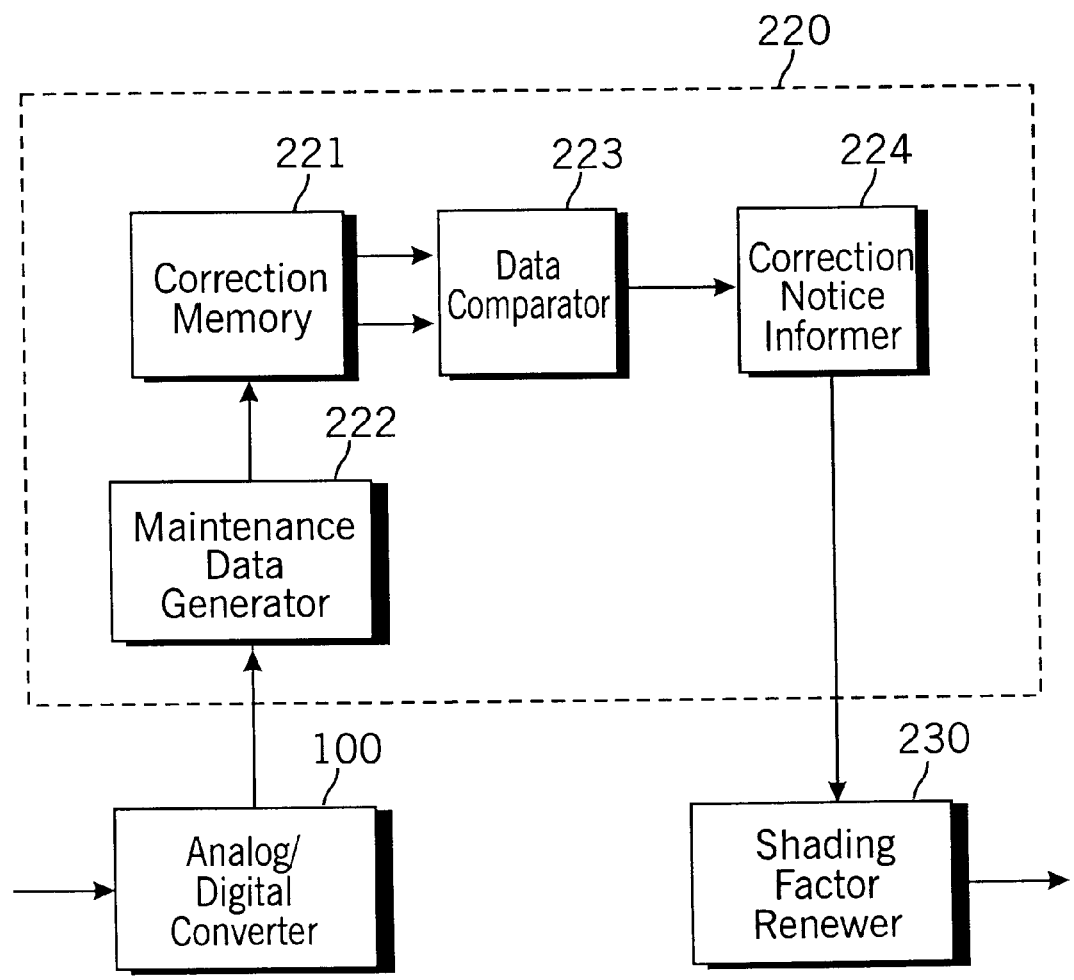
FIG. 3 is a block diagram showing the maintenance time determiner (timing determination corrector) of FIG. 2.

Referring to FIG. 3, the timing determination corrector 220 as shown in FIG. 3, includes a correction memory 221 for storing the standard data; a maintenance data generator 222 for storing the correction determination data as shading data achieved from the second shading reference pattern during the correction determination mode as the operation mode from the analog/digital convertor 100; a data comparator 223 for comparing whether the deviation data between the correction determination data at the present time and the standard data is above the allowed range; and a correction notice informer 224 for informing a correction time for the shading factor renewer 230 in case of the occurrence of the deviation above the preset allowed range to the shading factor renewer 230 using audio, visual or audio-visual alarm means.

Preferably, the first shading reference pattern is a white paper, and the second shading reference pattern is a white roller. In addition, the standard data is preferably shading data for correction determination prepared by scanning the second shading reference pattern at the preset storage time, and the preset storage time is preferably the time of manufacturing of the image scanning system.

Continuing with reference to FIGS. 2 and 3, the present invention uses a non-volatile memory, such as a Flash Memory, as the shading memory 210 for the purpose of improving image quality directly. Also, the present invention allows a normal shading correction job without periodic pseudo scanning to renew the shading factor matrix by renewing the shading factor matrix after cleaning the optical parts of the system or performing a maintenance job such as fixing any defects by the steps of performing the shading correction job using the shading factor matrix already-stored in the shading memory 210, providing a means to detect and inform of the contamination or defect of optical parts to determine the maintenance time, automatically detecting the negative changes of characteristics in the optical parts, and making the time for maintenance well-informed in advance.

Here, the shading factor matrix can be obtained by the steps of achieving shading data from the average after scanning the first shading reference pattern repeatedly multiple times, more than at least one time, and dividing the shading data by a preset maximum pixel light value (M).

In the above scanning job, which is called pseudo scanning, the image sensor 20 scans the first shading reference pattern placed opposite to the image sensor 20, and the first shading reference pattern employs a white-color series of a correction pattern, such as a white panel, a white paper, a white roller, etc.

Especially, in a color image scanning system, the light reflected from the first shading reference pattern during a pseudo scanning is color-separated via a spectrometer filter for each color element, and shading data can be achieved for each color element by the photoelectric conversion in the image sensor 20 corresponding to each color element.

As described above, shading data for the colors of red, green, and blue is determined by scanning the white-color series correction pattern such as a white panel, a white paper, a white roller, etc., and color-separating the scanning results via an optical filter. However, alternatively, the shading data for respective colors other than the white can be achieved by scanning the additional-prepared shading reference patterns of red, green, and blue respectively, their saturation degree being 100%.

Here, the maximum pixel light value (M) can be achieved by subtracting 1 from the value of 2 to the number(m) of a preset bit power and can be shown as follows:

$$M = 2^m - 1 \qquad \text{Equation(1)}$$

where m is a preset bit number.

For example, provided that the analog/digital converter 100 converts into 8 bit digital image data, the maximum pixel light value, M, can be determined as 255 ($2^8 - 1 = 255$).

With the shading factor matrix prepared by the above method stored in the shading memory 210, the image sensor 20 receives the reflected light input via the optical module 10 proportional to the light amount, and converts it into analog image signals. The image sensor 20 is driven by the preset timing according to the sensor driving clock provided from the scanning controller 1. The scanning controller 1 focuses the light emitted from the lamp 12 being controlled by the lamp driver 13, and irradiates a document, and the light reflected from the document proportional to the density of the document is controlled to be input into the image sensor 20 via a constant path. Accordingly, the input reflected light is output as voltage signals after being converted proportional to the intensity of the light amount according to the image sensor 20 as a semiconductor device.

Then, the analog/digital converter 100 converts the analog image signals output from the image sensor 20 into digital image data having color components of a preset bit number (m).

In the present invention, it is preferable that 256 gray scales capable of displaying a unit pixel as 8 bits be used for the gradation of an image for binarization. The number of bits allotted can be adjusted, i.e. increased/decreased, according to the particular applied cases. The pixel can be shown more exactly and in more detail when allotting more bits to the pixel during analog/digital conversion, but expenses are increased, and the volume of operation during the signal treatment is typically increased by a geometrical progression.

When the operation mode of the image scanning system is in a real scan mode, the shading corrector 240 performs the shading correction job by multiplying the shading factor matrix and the digital image data output from the analog/digital converter 100 for each pixel location so that the shading-corrected digital image data can be provided.

However, in a case when the periodic pseudo scanning to renew the shading factor matrix is omitted, and the shading correction is performed using the shading factor matrix prepared using preset shading data, a serious error in the shading correction can occur especially with the changes of the characteristics of optical mechanism parts, except a shading reference pattern such as a white roller, etc.

For example, optical mechanism parts of an image scanning system includes a lens, a light source, and the like, and the characteristic changes of these parts cause changes of the light amount. In this regard, when the surface of glass through which a document passes is seriously fouled, the above error can be more serious. Therefore, it is necessary to inform a user of the image scanning system of the time of cleaning, fixing, or replacing the optical mechanism parts by detecting the characteristic changes.

The present invention uses a second shading reference pattern for the purpose of maintenance detection, its preciseness can be relatively low mechanically or optically, and its associated expenses are typically low. In the step of manufacturing products, an initial shading factor matrix is prepared from the first shading reference pattern, and at the same time, standard data is prepared by scanning the second shading reference pattern to set the standard value for detecting the maintenance time.

For example, the timing determination corrector 220 periodically prepares correction determination data from shading data obtained from the second shading reference pattern in order to determine the correction timing for optical parts including the lamp 12, and determines whether the data difference (hereinafter referred to as deviation data) between the correction determination data at the present time and the preset standard data shows a certain difference over an allowed range, and gives a notice in such case.

Described in more detail, the correction memory 221 of the timing determination corrector 220 stores the standard data, and stores the correction determination data prepared in the maintenance data generator 222. The maintenance data generator 222 stores the maintenance determination data as shading data achieved from the second shading reference pattern at the operation mode of the correction determination from the analog/digital converter 100. The data comparator 223 compares if the deviation data between the correction determination data at the present time and the standard data is above a preset allowed range or preset allowed value. If a deviation is found above the preset value after the comparison, the correction notice informer 224 informs the correction time to the shading factor renewer 230, and informs a user of the correction time using an audio, visual or audio-visual alarm means.

Then, the shading factor renewer 230 renews the shading factor matrix by scanning the first shading reference pattern after the correction is made for the optical parts on the receipt of the information from the timing determination corrector 220 that the deviation data is above a preset allowed value.

Therefore, according to the present invention, the correction for the image scanning system can be timely made by easily detecting the correction time for the optical parts, and timely performing the correction jobs, such as cleaning the fouled optical parts, fixing any defective parts, etc. In addition, normal shading correction can be made by renewing the shading factor matrix using the first shading reference pattern as necessary, even skipping the periodical pseudo scanning, and minimizing the shading correction distortion.

Here, the shading memory 210 and the correction memory 221 of the present invention preferably uses a Flash Memory which is a typical non-volatile memory, and also, a static random access memory (SRAM), for which backup power is supplied, can be used.

Now, hereinafter, a method for shading correction in the image scanning system according to a preferred embodiment of the present invention is described in detail referring to FIG. 4.

Figure 4:
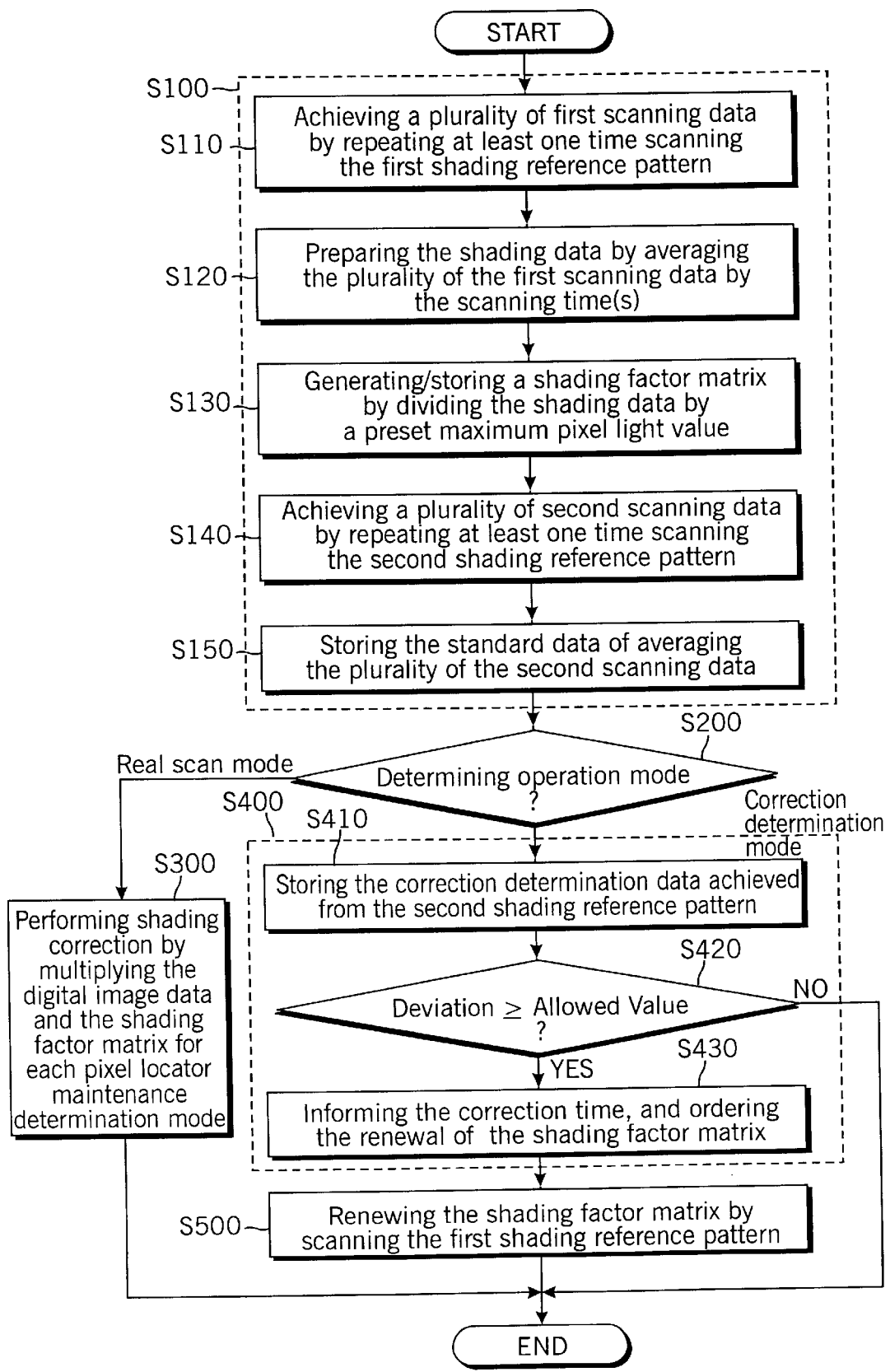
FIG. 4 is flow chart showing the sequences of a shading correction method of an image scanning system according to an embodiment of the present invention.

A preferred embodiment of a method for shading correction in the image scanning system to read image data of a document by photoelectric conversion according to the present invention, as shown in FIG. 4, includes the steps of: producing a shading factor (step S100) of producing/storing a shading factor matrix including shading factors corresponding to pixel locations respectively, which is achieved by scanning a first reference pattern made at the preset storage time, forming shading data by scanning a second shading reference pattern, and storing it as a standard data to determine the time; determining an operation mode (step S200) of determining whether the operation mode of the image scanning system is a real scan mode to perform the real scanning, or a correction determination mode to determine the correction time for optical parts; performing a shading correction (step S300) if the above result of the step S200, the operation mode determination is a real scan mode, performing shading correction by scanning a document and rice counting the shading factor matrix for each pixel location to the digital image data output by the analog/digital converter; determining a correction time (step S400) if the above result of the step S200 is the correction determination mode, including informing the correction time to the outside, such as to a user, by periodically preparing the correction determination data as shading data achieved from the second shading reference pattern, and detecting whether there is deviation data between the correction determination data at the present time and the standard data that is above a certain allowed range; and renewing a shading factor (step S500) of performing the correction job for the optical parts on receipt of the notice of correction time, and renewing the shading factor matrix by scanning the first shading reference pattern.

The step of producing a shading factor (step S100) includes steps of: achieving a plurality of the first scanning data by scanning the first shading reference pattern more than at least once (step S110); achieving shading data by averaging the plurality of the first scanning data by the scanning times (step S120); achieving/storing a shading factor matrix by dividing the shading data by preset maximum pixel light value (M) (step S130); achieving a plurality of second scanning data by scanning the second shading reference pattern more than at least once (step S140); and storing the standard data averaging the plurality of the second scanning data (step S150).

The step of determining correction time (step S400) includes the steps of: storing the correction determination data achieved from the second shading reference pattern when the operation mode is in a correction determination mode (step S410); comparing whether the deviation data between the correction determination data at the present time and the standard data is above an allowed range or a preset allowed value (step S420); and ganerating an order to renew the shading factor matrix, preferably after informing the time to the outside of the image scanning system, such as to a user, for example, if there is deviation above the preset allowed value as the result of the comparison step S420 (step S430).

Continuing with reference to FIG. 4, in the step of producing a shading factor (step S100) in a method for shading correction in an image scanning system to read the image data by photoelectric conversion, a shading factor matrix including shading factors corresponding with each pixel location by scanning the first shading reference pattern at the preset storage time is produced and stored as standard data to determine the correction time after scanning the second shading reference pattern and forming shading data.

Described in more detail, in the step of producing a shading factor (step S100), the first shading reference pattern is scanned repeatedly (more than at least once) so as to achieve the plurality of the first scanning data, and in the step S120, shading data is achieved by averaging the plurality of the first scanning data by scanning times. Then, in the step S130, the shading factor matrix is generated, achieved and stored by dividing the shading data by the preset maximum pixel light value (M). In addition, to detect the correction time, in the step S140, a plurality of the second scanning data is achieved by scanning the second shading reference pattern repeatedly (more than at least once), and in the step S150, the standard data of averaging the plurality of the second scanning data is stored.

In the step of determining the operation mode (step S200) with the shading factor matrix prepared by the above steps, and the standard data already stored, it is determined whether the operation mode of the image scanning system is in a real scan mode to perform real scanning, or in a correction determination mode to determine a correction time for optical parts of the image scanning system.

As a result of the step of determining the operation mode, step S200, if the determination result is a real scan mode, shading correction is performed in the step S300, by multiplying the shading factor matrix for each pixel location and the digital image data output after scanning a document, and including analog/digital-converting of the image data.

Meanwhile, as a result of the step of determining the operation mode, step S200, if the determination result is a correction mode, correction determination time is informed and determined by determining whether the deviation data between the correction data at the present time and the standard data while periodically preparing correction determination data as shading data achieved from the second shading reference pattern is above a certain allowed range or allowed value.

Described in more detail, during performing the step of determining correction time, step S400, if the operation mode is a correction determination mode, the storing step S410 allows the determination data achieved from the second shading reference pattern to be stored. In the step step S420, it is determined whether the deviation data between the correction data at the present time and the standard data is above a certain allowed value, and as the result of the determination of the S420, in the step S430, the correction time is preferably informed, such as by an alarm, and an order to renew the shading factor matrix is generated.

In the step S500 of FIG. 4, the shading factor matrix is renewed by scanning the first shading reference pattern after the correction job is made for the optical parts on receipt of the correction time.

By the shading factor matrix including the shading factors counted as above, the shading correction is performed for each color element and each pixel location, and digital image data is achieved, whereby its output deviation minimized.

According to the previously described method, the preciseness of the shading correction can be improved because the shading factors are counted respectively for the whole surface regions to be scanned. However, the method can have a drawback in that the storage capacity and the counting volume are proportional to the size of a document.

However, in another preferred embodiment of the method for shading correction to resolve the above drawback, a shading factor is counted for a single horizontal line, and is applied on the whole horizontal lines (a step of counting a shading factor, step S300), and therefore, the shading correction can be performed at high speed with minimal use of resources and providing sufficient shading correction characteristics. In other words, the present invention can also provide a color image scanning system which is stably operated systematically with a relatively small volume of hardware.

In this regard, a color image scanning system based on shuttle scanning is a good example to employ the another embodiment of the present invention because the shading distortion for a vertical direction (i.e. a sub-scanning direction) is relatively little to be disregarded for the horizontal direction (i.e. a main scanning direction). However the shading correction function in the another embodiment of the method for shading correction in the color image scanning system of the present invention is typically lower than in the previously described preferred embodiment of the present invention.

Meanwhile, in embodiments of the present invention, the maximum light value (M) as shown in the previous Equation (1) is achieved preferably by subtracting 1 from the value of 2 to the no number of a preset bit power, which is determined as a maximum gray scale shown using provided bits (m).

Further, as described above, the image scanning system to read image data from a document by photoelectric conversion employs a non-volatile memory, such as a Flash Memory, as the shading memory 210 to directly correct image distortion. The present invention allows the shading correction using a shading factor matrix prestored in the shading memory, and at the same time, allows a normal shading correction job, even omitting periodically-carried out pseudo scanning, to renew the shading factor matrix by automatically detecting negative characteristics of changes of optical parts with means to detect/inform of contamination or damages of the optical parts to determine a correction time, and by renewing the shading factor matrix only after performing a correction job including cleaning the fouled optical parts or fixing the damages on receipt of the notice of correction time.

According to the present invention, optimized image quality is provided by removing the image distortion due to the distance between the shading reference pattern and a document, and optical density deviation of the shading reference pattern. Also, the present invention promotes avoidance of increased expenses increase due to the improvement of the preciseness of the shading reference pattern (i.e. contact, flatness, optical density of white, etc.) to solve the image distortion. Also, in a case of the image scanning system using a shading reference pattern of a white roller type, the difficulties of exactly aligning a center line of a white roller to the image sensing line during assembly of components are substantially reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A shading correction apparatus of an image scanning system, comprising:

an image sensor to output analog image signals by the photoelectric conversion of an optical density of a document;

an analog/digital converter for converting the analog image signals into digital image data having a preset number of bits;

a shading memory for storing a shading factor matrix prepared from a first shading reference pattern at a preset storage time for direct shading correction at the location of each corresponding pixel;

a timing determination corrector for periodically generating correction determination data as shading data achieved from a second shading reference pattern to determine a correction time for optical parts of the image scanning system when the operation mode of the image scanning system is in a correction determination mode, and to inform whether a deviation data between the correction determination data at a present time and preset standard data is above an allowed value; and a shading corrector for performing shading correction on receipt of the output from the analog/digital converter using the shading factor matrix when the operation of the image scanning system is in a real scan mode.

2. The shading correction apparatus of claim 1, further comprising a shading factor renewer for renewing the shading factor matrix by scanning the first shading reference pattern after performing shading correction for optical parts of the image scanning system on receipt of information from the timing determination corrector that the deviation data is above a preset allowed value.

3. The shading correction apparatus of claim 2, wherein the timing determination corrector comprises:

a correction memory for storing the preset standard data;

a maintenance data generator for receiving correction determination data as shading data achieved from the second shading reference pattern at the correction determination mode from the analog/digital converter and storing the correction determination data into the correction memory;

a data comparator for comparing whether the deviation data between the correction determination data at the present time and the preset standard data is above a preset allowed value; and a correction notice informer for informing the correction time to the shading factor renewer if there is a deviation above the preset allowed value as a result of the comparison by the data comparator, and for providing an alarm as to the correction time to a user using at least one of an audio alarm and a visual alarm.

4. The shading correction apparatus of claim 3, wherein a maximum pixel light value (M) for the shading factor matrix is achieved by subtracting 1 from the value of 2 to a number (m) of a preset bit power, wherein $M=2^m-1$.

5. The shading correction apparatus of claim 4, wherein the first shading reference pattern comprises a white paper.

6. The shading correction apparatus of claim 5, wherein the second shading reference pattern comprises a white roller.

7. The shading correction apparatus of claim 6, wherein the preset standard data is shading data for determining the correction time prepared by scanning the second shading reference pattern at the preset storage time.

8. The shading correction apparatus of claim 7, wherein the preset storage time is a time of manufacturing of the image scanning system.

9. The shading correction apparatus of claim 8, wherein the shading memory comprises a Flash Memory.

10. The shading correction apparatus of claim 2, wherein the shading memory comprises a Flash Memory.

11. The shading correction apparatus of claim 1, wherein the timing determination corrector comprises:
- a correction memory for storing the preset standard data;
- a maintenance data generator for receiving correction determination data as shading data achieved from the second shading reference pattern at the correction determination mode from the analog/digital converter and storing the correction determination data into the correction memory;
- a data comparator for comparing whether the deviation data between the correction determination data at the present time and the preset standard data is above a preset allowed value; and
- a correction notice informer for informing the correction time if there is a deviation above the preset allowed value as a result of the comparison by the data comparator.

12. The shading correction apparatus of claim 11, wherein a maximum pixel light value (M) for the shading factor matrix is achieved by subtracting 1 from the value of 2 to a number (m) of a preset bit power, wherein $M=2^m-1$.

13. The shading correction apparatus of claim 12, wherein the preset standard data is shading data for determining the correction time prepared by scanning the second shading reference pattern at the preset storage time.

14. The shading correction apparatus of claim 13, wherein the preset storage time is a time of manufacturing of the image scanning system.

15. The shading correction apparatus of claim 14, wherein the shading memory comprises a Flash Memory.

16. The shading correction apparatus of claim 1, wherein a maximum pixel light value (M) for the shading factor matrix is achieved by subtracting 1 from the value of 2 to a number (m) of a preset bit power, wherein $M=2^m-1$.

17. The shading correction apparatus of claim 16, further comprising a shading factor renewer for renewing the shading factor matrix by scanning the first shading reference pattern after performing shading correction for optical parts of the image scanning system on receipt of information from the timing determination corrector that the deviation data is above a preset allowed value.

18. The shading correction apparatus of claim 1, wherein the first shading reference pattern comprises a white paper.

19. The shading correction apparatus of claim 1, wherein the second shading reference pattern comprises a white roller.

20. The shading correction apparatus of claim 1, wherein the preset standard data is shading data for determining the correction time prepared by scanning the second shading reference pattern at the preset storage time.

21. The shading correction apparatus of claim 1, wherein the preset storage time is a time of manufacturing of the image scanning system.

22. A method for shading correction for an image scanning system to read image data of a document by photoelectric conversion, comprising the steps of:
- producing and storing a shading factor matrix comprising shading factors corresponding to each pixel location from a scanned image of a first shading reference pattern at a preset storage time;
- storing shading data achieved by scanning a second shading reference pattern as a standard data to determine a correction time;
- determining whether the operation mode of the image scanning system is a real scan mode for real-scanning or a correction determination mode for determining the correction time;
- performing shading correction by multiplying (a) digital image data output after analog to digital converting a scanned document and (b) the shading factor matrix for the each pixel location, if the operation mode of the image scanning system is the real scan mode; and
- determining the correction time by periodically preparing correction determination data as shading data achieved from the second shading reference pattern, if the operation mode of the image scanning system is the correction determination mode, and determining whether deviation data between the correction determination data at a present time and the standard data is above a preset allowed value.

23. The method of claim 22, further comprising the step of renewing the shading factor matrix by scanning the first shading reference pattern after performing shading correction on receipt of information of the correction time.

24. The method of claim 23, wherein the step of producing and storing the shading factor matrix comprises the steps of:
- determining a plurality of first scanning data by repeating at least one time scanning the first shading reference pattern;
- providing shading data by averaging the plurality of the first scanning data by a scanning time;
- producing the shading factor matrix by dividing the shading data by a preset maximum pixel light value and then storing the shading factor matrix;
- determining a plurality of second scanning data by repeating at least one time scanning the second shading reference pattern; and
- storing data determined by averaging the plurality of the second scanning data as the standard data.

25. The method of claim 24, wherein the step of determining the correction time comprises the steps of:
- storing the correction determination data achieved from the second shading reference pattern at the correction determination mode;
- comparing whether there is a deviation between the correction determination data at the present time and the standard data above the preset allowed value; and
- generating an order to renew the shading factor matrix if there is a deviation above the preset allowed value.

26. The method of claim 25, wherein a maximum pixel light value (M) for the shading factor matrix is achieved by subtracting 1 from the value of 2 to a number (m) of a preset bit power, wherein $M=2^m-1$.

27. The method of claim 26, wherein the standard data is shading data prepared by scanning the second shading reference pattern at the preset storage time.

28. The method of claim 27, wherein the preset storage time is a time of manufacturing the image scanning system.

29. The method of claim 27, wherein the first shading reference pattern comprises a white paper.

30. The method of claim 27, wherein the second shading reference pattern comprises a white roller.

31. The method of claim 22, wherein the step of producing and storing the shading factor matrix comprises the steps of:

determine a plurality of first scanning data by repeating at least one time scanning the first shading reference pattern;

providing shading data by averaging the plurality of the first scanning data by a scanning time;

producing the shading factor matrix by dividing the shading data by a preset maximum pixel light value and then storing the shading factor matrix;

determining a plurality of second scanning data by repeating at least one time scanning the second shading reference pattern; and storing data determined by averaging the plurality of the second scanning data as the standard data.

32. The method of claim 31, wherein the step of determining the correction time comprises the steps of:

storing the correction determination data achieved from the second shading reference pattern at the correction determination mode;

comparing whether there is a deviation between the correction determination data at the present time and the standard data above the preset allowed value; and generating an order to renew the shading factor matrix if there is a deviation above the preset allowed value.

33. The method of claim 32, wherein a maximum pixel light value (M) for the shading factor matrix is achieved by subtracting 1 from the value of 2 to a number (m) of a preset bit power, wherein $M=2^m-1$.

34. The method of claim 22, wherein the step of producing and storing the shading factor matrix comprises the steps of:

determining a plurality of first scanning data by repeating at least one time scanning the first shading reference pattern;

providing shading data by averaging the plurality of the first scanning data by a scanning time;

producing the shading factor matrix by dividing the shading data by a preset maximum pixel light value and then storing the shading factor matrix;

determining a plurality of second scanning data by repeating at least one time scanning the second shading reference pattern; and storing data determined by averaging the plurality of the second scanning data as the standard data.

35. The method of claim 22, wherein the step of determining the correction time comprises the steps of:

storing the correction determination data achieved from the second shading reference pattern at the correction determination mode;

comparing whether there is a deviation between the correction determination data at the present time and the standard data above the preset allowed value; and generating an order to renew the shading factor matrix if there is a deviation above the preset allowed value.

36. The method of claim 22, wherein a maximum pixel light value (M) for the shading factor matrix is achieved by subtracting 1 from the value of 2 to a number (m) of a preset bit power, wherein $M=2^m-1$.

37. The method of claim 22, wherein the first shading reference pattern comprises a white paper.

38. The method of claim 22, wherein the second shading reference pattern comprises a white roller.

39. The method of claim 22, wherein the standard data is shading data prepared by scanning the second shading reference pattern at the preset storage time.

40. The method of claim 22, wherein the preset storage time is time of manufacturing the image scanning system.

* * * * *